(12) United States Patent
Chandrashekar et al.

(10) Patent No.: US 12,200,395 B2
(45) Date of Patent: Jan. 14, 2025

(54) SYSTEMS AND METHODS FOR IMPROVED VIDEO CAPTIONS

(71) Applicant: Adeia Guides Inc., San Jose, CA (US)

(72) Inventors: Padmassri Chandrashekar, Karnataka (IN); Daina Emmanuel, Bangalore (IN); Jayshil Parekh, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/185,422

(22) Filed: Feb. 25, 2021

(65) Prior Publication Data

US 2022/0272284 A1 Aug. 25, 2022

(51) Int. Cl.
*H04N 5/278* (2006.01)
*H04N 5/85* (2006.01)

(52) U.S. Cl.
CPC ............ *H04N 5/278* (2013.01); *H04N 5/85* (2013.01)

(58) Field of Classification Search
CPC ................................ H04N 5/278; H04N 5/85
USPC ......................................................... 386/241
See application file for complete search history.

(56) References Cited

U.S. PATENT DOCUMENTS

| | | | | |
|---|---|---|---|---|
| 7,707,602 | B2 * | 4/2010 | Cragun | H04N 21/4532 725/86 |
| 8,856,218 | B1 * | 10/2014 | Inskip | H04N 21/85406 709/219 |
| 9,202,522 | B2 * | 12/2015 | Dhawan | H04N 13/183 |
| 11,128,929 | B2 * | 9/2021 | Dorsey | G11B 27/005 |
| 11,477,537 | B2 * | 10/2022 | Selfors | H04N 21/4856 |
| 11,611,807 | B2 * | 3/2023 | Chandrashekar | H04N 21/6587 |
| 2005/0038661 | A1 | 2/2005 | Momosaki et al. | |
| 2009/0132599 | A1 * | 5/2009 | Soroushian | G06F 16/41 |
| 2009/0169183 | A1 * | 7/2009 | Fujinami | G11B 27/329 386/E5.001 |
| 2015/0382064 | A1 | 12/2015 | Aravamudan | |
| 2021/0397404 | A1 * | 12/2021 | Daga | G10L 15/26 |
| 2022/0353584 | A1 * | 11/2022 | Chandrashekar | H04N 21/4394 |
| 2023/0088988 | A1 * | 3/2023 | Krishnamoorthi | H04N 21/4316 725/46 |
| 2023/0107968 | A1 * | 4/2023 | Trivedi | H04N 21/4856 434/157 |

FOREIGN PATENT DOCUMENTS

| | | | | |
|---|---|---|---|---|
| EP | 3352461 | A1 | 7/2018 | |
| WO | WO-2023044420 | A1 * | 3/2023 | H04N 21/2187 |

OTHER PUBLICATIONS

"ISR and Written Opinion", of PCT/US2021/064300 dated Mar. 29, 2022 (11 pages).

* cited by examiner

*Primary Examiner* — Helen Shibru
(74) *Attorney, Agent, or Firm* — Haley Guiliano LLP

(57) ABSTRACT

Systems and methods for improved video captions are disclosed. The methods for providing timed text comprise obtaining a plurality of subtitles for a media asset; determining a playback rate of the media asset; determining a relevance index based on the playback rate; and selecting a set of the plurality of subtitles based on the relevance index. The methods may further comprise determining an indication of priority of subtitles within the set of subtitles, rendering the set of subtitles according to the indication of priority, wherein the highest priority subtitles are rendered first.

17 Claims, 7 Drawing Sheets

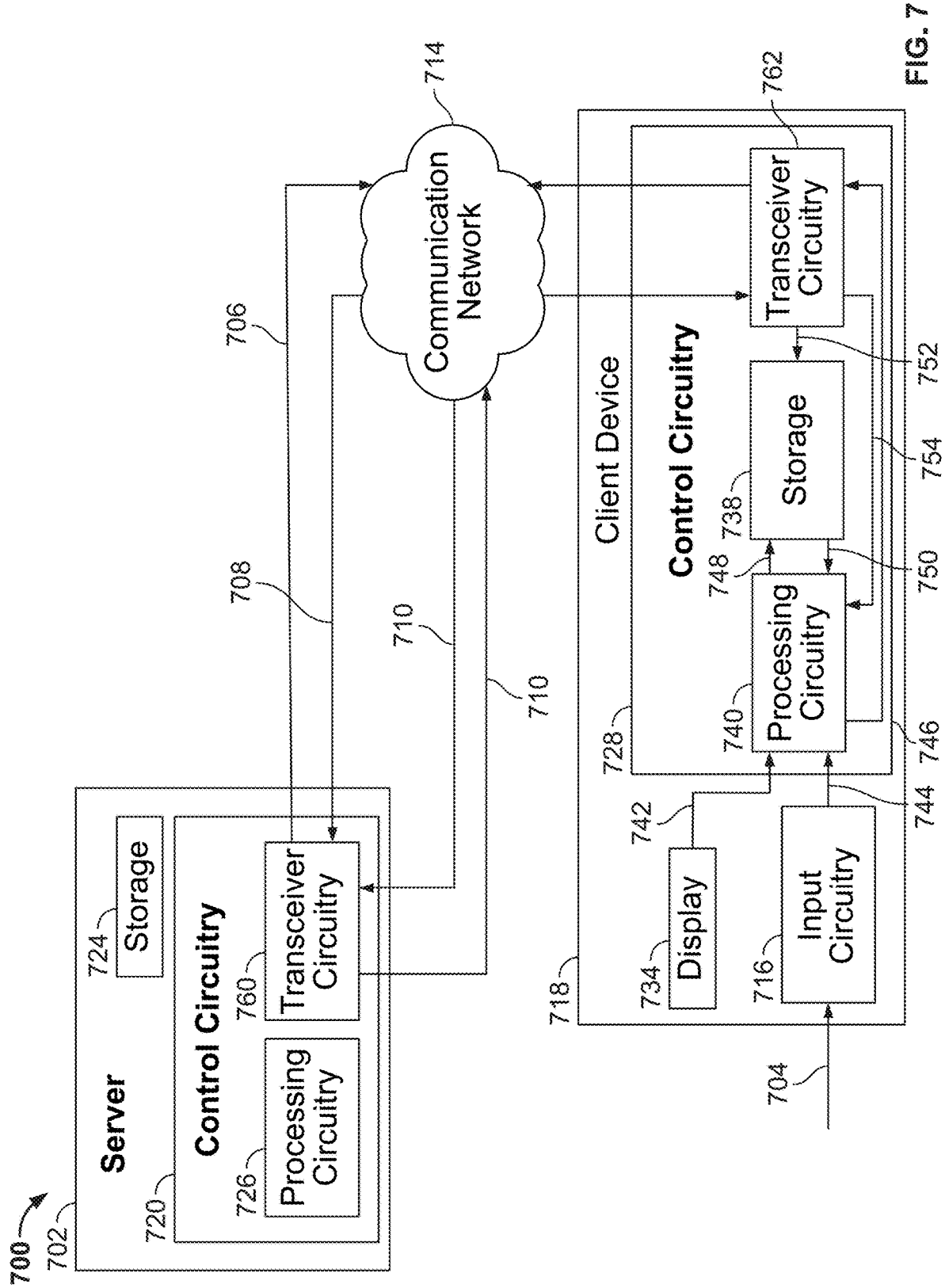

SYSTEMS AND METHODS FOR IMPROVED VIDEO CAPTIONS

BACKGROUND

The present disclosure relates to closed caption text systems and methods, such as subtitles, and more particularly to providing closed captions for videos with variable a playback speed.

SUMMARY

Closed captioning and subtitling are both processes of displaying text on a television, video screen, or other visual display to provide additional or interpretive information. Both closed captions and subtitles are conventionally shown as a transcription of the speech in an audio portion of a media asset (e.g., a video) as it occurs. Captions are a transcription or translation of the dialogue, sound effects, relevant musical cues, and other relevant audio information when sound is unavailable or not clearly audible, i.e., whereas subtitles may be thought of as a transcription or translation of the dialogue when sound is available but not understood.

Closed captions and subtitles may also be referred to colloquially as timed text. Timed text refers to the presentation of text media in synchrony with other media assets, such as audio and video. The timed text file is a container file for chunks of data that are time-aligned with a video or audio resource. It can therefore be regarded as a serialization format for time-aligned data. A timed text file starts with a header and then contains a series of data blocks. If a data block has a timing schedule, such as a start and end time, it is called a cue. A comment is another example of a data block. Timed text caption or subtitle cues are rendered as overlays on top of a video viewport or into a region, which is a subarea of the video viewport.

A particular use of subtitles is providing the translation of the speech of a video so that the viewer can listen to the video as intended by the content creator but still be able to understand the context of the video, if the video is not in a language the viewer can understand. For example, in attempting to learn a second language, viewers will watch movies or TV shows recorded in the language they are studying and use subtitles in their own language as a learning aid.

In another example, anime is a genre of video content that is popular in Japan, and often viewers prefer to watch the original Japanese version rather than a dubbed English version. However, an English speaker with no Japanese language skills would be left unable to understand the original Japanese version of an anime show without subtitles providing the translation of the audio portion of the video. In this example, the desire to understand the context of the video and the storyline is more important than the speech itself. Therefore, viewers may choose to watch the video at an increased playback rate.

When viewing a video at a speed other than the normal speed, i.e., at an increased rate, conventional media systems do not display any closed captions or subtitles, or the audio is sub-sampled to fit in the reduced time duration for playback. Closed captions, subtitles or audio description are conventionally created by tagging portions of text with timestamps or to certain video frames. Therefore, the subtitles are synced with certain parts of a video and the subtitles are rendered while the viewer is watching the video. At increased speeds, typically beyond ×2, subtitles are not shown to the viewers because the audio is no longer intelligible or the subtitles appear too fast to be read by the viewer. Indeed, conventional media asset players such as "YouTube" do not have a playback rate that exceeds ×2 for this reason. This leads to adverse user experience when viewers want to consume the media asset (e.g., video) at an increased rate but also want to be able to read the subtitles or captions of the video.

Improved captioning and subtitling mechanisms, techniques, and systems described herein are introduced to provide a better viewing experience for a viewer of a media asset such as video, audio, or the like.

In one approach, a method for providing timed text is provided. The method comprises obtaining a plurality of subtitles for a media asset, determining a playback rate of the media asset, determining a relevance index based on the playback rate, and selecting a set of the plurality of subtitles based on the relevance index. For example, when a user has selected to watch a video on a video player or platform at a playback rate of 4×, the relevance index would reflect this setting, and an appropriate set of subtitles would be selected so that the subtitles are readable at a playback rate of 4×, which would otherwise not be possible with the subtitles at 1× or 2× playback rate.

In some embodiments, the method further comprises determining an indication of priority of subtitles within the set of subtitles. In this way, it is possible to distinguish between more important content within the subtitles themselves. Accordingly, in some embodiments, the method further comprises rendering the set of subtitles according to the indication of priority. For example, a set of subtitles may have the same relevance index, which is related to the playback rate of the media asset, but one set may have a higher priority than the other, which informs the system to render the subtitles in order of priority.

In some embodiments, the highest-priority subtitles are rendered first and the lowest-priority subtitles are rendered last. For example, if the resources of the system are limited, the system can ensure the highest-priority subtitles are rendered.

In some embodiments, the timed text comprises a header and a plurality of data blocks. In some examples, the header of the timed text file identifies the format that the timed text file is in (e.g., WebVTT, TTML, SubRip, or the like). In some embodiments, the data blocks may be one, or more, of a text for display, a timing schedule, the relevance index, an indication of priority, or a context tag. Other examples of data blocks include chapters, metadata on the scene, the speakers, typesetting and fonts. Any example data block in the W3C WebVTT or TTML should be considered as included herein as a valid data block. Moreover, in some embodiments, the data block comprises metadata. For example, when the data block is a timing schedule, the timing schedule comprises a start time and an end time for displaying the text for display.

In some embodiments, the method further comprises displaying the selected set of subtitles. In some embodiments, the method further comprises displaying the media asset. In some embodiments, the method comprises overlaying the selected set of subtitles on the media asset. Subtitles as described herein can be opened together in media asset players that render the text into the movie or video clip while playing it. In this way, the subtitles will look different in different players, because the choice of font, size and color is left to the media asset players.

The playback rate of the media asset can be determined in a number of ways. In some embodiments, the playback rate is signalled by a media asset player configured to play the media asset. In some embodiments, the playback rate is selected by a user of the media asset player. In addition, the playback rate may be preselected by a user and saved in a user profile. Accordingly, in some embodiments, the method further comprises accessing a user profile. In some embodiments, the user profile contains data indicative of the playback rate. The data in the user profile may contain other metadata information, which is described in more detail with regard to the detailed description.

In another approach, there is provided a system for providing timed text. The system may comprise memory configured to store a plurality of subtitles and control circuitry configured to obtain a plurality of subtitles for a media asset, determine a playback rate of the media asset, determine a relevance index based on the playback rate, and select a set of the plurality of subtitles based on the relevance index.

In another approach, there is provided an apparatus for providing timed text. The apparatus may comprise means for obtaining a plurality of subtitles for a media asset, means for determining a playback rate of the media asset, means for determining a relevance index based on the playback rate, means for selecting a set of the plurality of subtitles based on the relevance index.

In another approach, there is provided a playlist for timed text, the playlist comprising text to be displayed, a timing schedule for when the text is to be displayed, and a relevance index of the text to be displayed, wherein the relevance index is determined based on a playback rate of the playlist.

In another approach, there is provided a non-transitory, computer-readable medium having instructions encoded thereon for carrying out the methods as described herein.

In another approach, there is provided a system comprising control circuitry configured to execute the methods as described herein.

For the avoidance of doubt, the systems and methods provided herein apply equally to subtitles, captions and timed text. For example, in some jurisdictions the term "subtitles" is taken to mean a textual description that is used when the viewer can hear but cannot understand the language or accent, or the speech is not entirely clear, and so subtitles may transcribe only dialogue and some on-screen text. Timed text may only refer to the file that the subtitles are contained within if, and only if, the file contains a timing schedule. Captions may aim to describe to the deaf and hard of hearing all significant audio content, such as spoken dialogue and non-speech information such as the identity of speakers and, occasionally, their manner of speaking, along with any significant music or sound effects, using words or symbols. However, in other jurisdictions, the term "subtitles" does not distinguish between subtitles and captions. Thus, for the sake of brevity throughout the following disclosure, the term "subtitles" will be used to mean subtitles and/or captions and/or timed text.

Advantages of the present disclosure allow for a user to view the subtitles of a video when the playback rate of the video is at such a rate that the audio is unintelligible or not available.

BRIEF DESCRIPTION OF THE DRAWINGS

The above and other objects and advantages of the disclosures will be apparent upon consideration of the following detailed description, taken in conjunction with the accompanying drawings, in which:

FIG. 7 is a block diagram representing devices, components of each device, and data flow therebetween for providing timed text, in accordance with some embodiments of the disclosure.

DETAILED DESCRIPTION

Given the recent rise in video consumption via Internet Protocol (IP), many users prefer to consume the content at an increased rate. Therefore, conventional client devices (e.g., mobile, Smart TV, PCs, etc.) comprise media content players that support playback at a range of speeds (e.g., 0.5×, 1×, 1.25×, 1.5×, 2×). At such speeds, the audio portion of the media content is modulated or subsampled based on the speed itself. Conventional media content players do not exceed these playback speeds because the audio becomes unintelligible, and if they do exceed those playback speeds, audio is not provided. That is to say that video players do not exceed 2× speed and provide audio to the user at the same time.

Due to the way captions and subtitles are provided in conventional systems, as will be described in more detail below, when the playback rate exceeds 2× as described above, the audio is no longer provided, and therefore the subtitles are no longer provided either. There is then an adverse user experience for those who wish to watch media content at speeds greater than 2×. However, simply providing the captions for playback rates greater than 2× is still insufficient, because at very high playback rates, such as 4× and 8×, the user would not be able to read the captions or subtitles.

Above are descriptions of "trick play" and "variable playback rate," which are terms used when describing a user consuming a media asset at a speed other than what was intended by the media asset producer. Variable rate playback can be performed in a number of ways. In some examples, a normal playback rate for a video may be 60 frames per second; if a user then chooses a playback speed of 2×, the media content player may drop every other frame. In some examples, the normal playback rate for a video may be 30 frames per second; if a user then chooses a playback speed of 2×, the media content player may be capable of playing the video at 60 frames per second so the desired outcome is achieved, but notably no frames are dropped. Similar processing can be performed on the audio portion of a media asset.

Figure 1A:
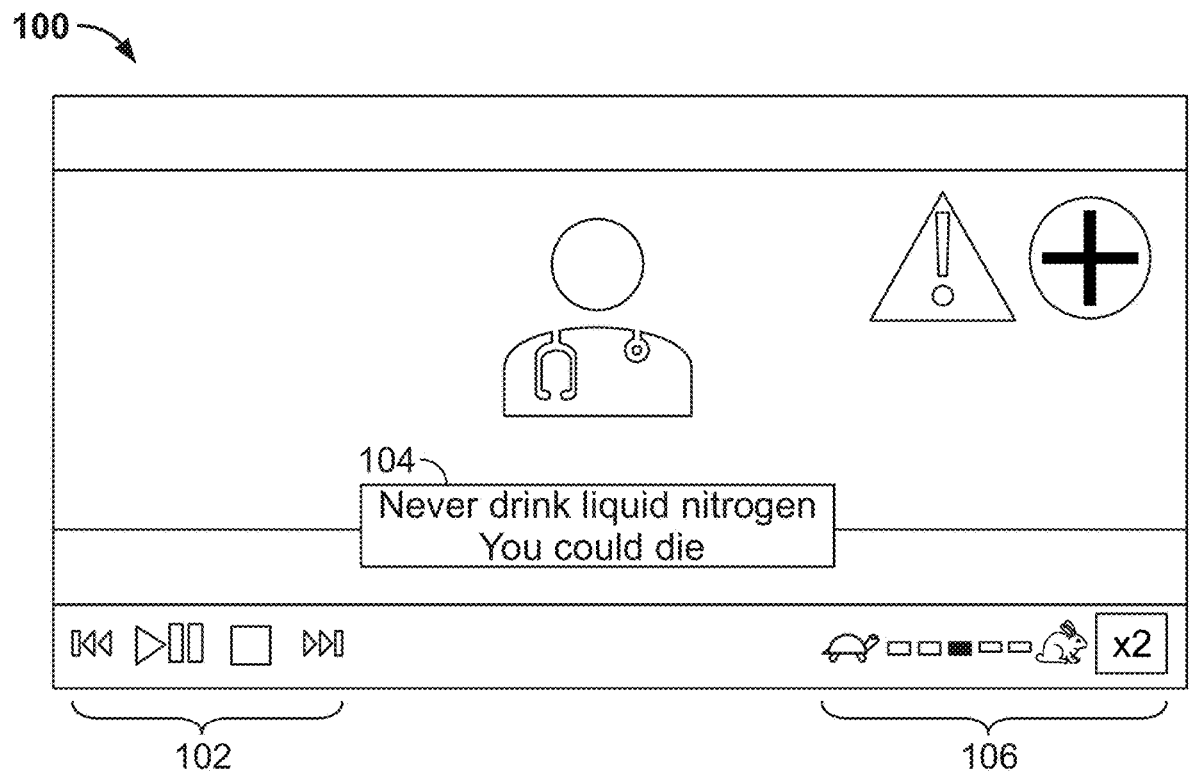
FIGS. 1A and 1B illustrate media asset players at two different playback rates, in accordance with some embodiments of the disclosure.
Figure 1B:
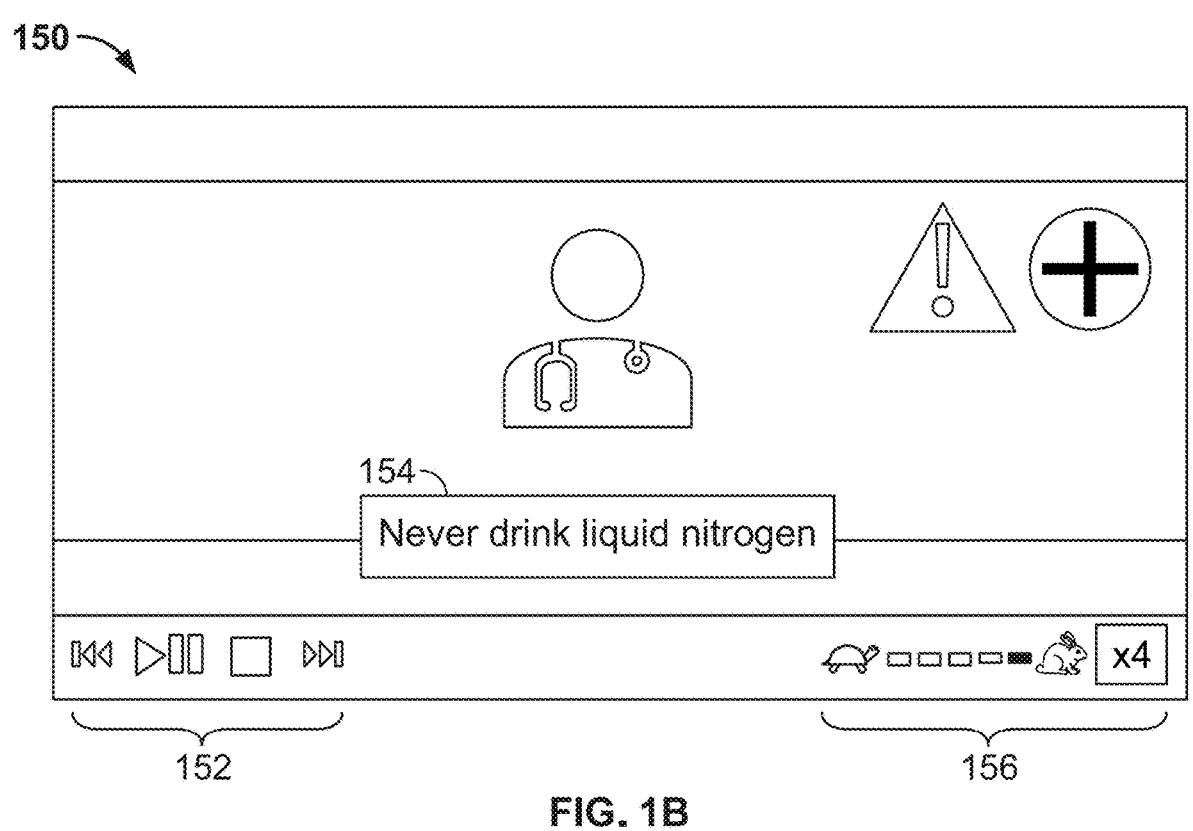

FIGS. 1A and 1B illustrate media asset players 100, 150. The media asset players 100, 150 are showing an informative media asset regarding the dangers of drinking liquid nitrogen, as shown in the timed texts 104, 154. Media asset player 100 also comprises media asset controls 102 and playback rate indicator 106.

As shown in FIG. 1A, the playback rate indicator 106 shows that the media asset playback rate is 2× the original speed of the media asset. The timed text 104 comprises the phrases "Never drink liquid nitrogen" and "You could die." As shown in FIG. 1B, the playback rate indicator 156 shows that the media asset playback rate is 4× the original speed of the media asset. The timed text 154 comprises the phrase "Never drink liquid nitrogen."

When comparing FIGS. 1A and 1B, the playback rate in FIG. 1B is greater than the playback rate in FIG. 1A, as shown by playback rate indicators 106, 156. Due to the increased playback rate, the timed text 154 has been reduced to just the phrase "Never drink liquid nitrogen." In some examples, when the user selects an increased rate of playback, the subtitles selected to be shown are selected based on the playback rate. In some examples, the most important text is maintained when the playback rate of the media asset is increased. When the playback rate is increased, that portion of the video will be shorter and there will be less time for the user to read the timed text 154. Therefore, a more appropriate set of subtitles can be selected and shown to the user.

The shortening of the text may include omitting additional sentences or information (as in the example in FIGS. 1A & 1B). However, other methods may include removing at least one of a plurality of filler words, also known as discourse markers, pause fillers, or hesitation forms. Common examples of filler words include "uh," "um," "er," "ah," "okay," "like," "right," "so," and "you know," but many other such discourse markers or filler words exist and vary based on language, dialect or accent. Therefore, this list should not be taken to be completely exhaustive. In some examples, the system may use artificial intelligence (AI) to shorten a sentence. For example, the sentence "No, I have not done that yet, sorry," could be shortened to "No, sorry."

The controls 102, 152 comprise a play/pause button, stop button, rewind button and fast-forward button, although these are largely for illustrative purposes and in other media asset players may be omitted in part, omitted in their entirety, shown in a different configuration, or be represented by other symbols. Playback rate indicators 106, 156 comprise a visual representation of the playback rate with a turtle and hare pictogram, largely for illustrative purposes and in other media asset players may be omitted in part, omitted entirely, shown in a different configuration, or be represented by other symbols.

The media asset players 100, 150 are conventionally configured to play the media asset at "original speed" (e.g., at 1× playback speed); however, the media asset players 100, 150 may be configured to play the media asset at a different speeds and any combination of trick play or variable playback rates greater than 1×.

For example, when a user has selected to watch a media asset on a media player or platform at a playback rate of 4×, the relevance index would reflect this setting, and the system would then select appropriate set of subtitles would be selected so that the subtitles are readable at a playback rate of 4×. In conventional systems, the subtitles of original speed would simply be played at 4×, a rate at which it would not be possible to read subtitle in its entirety before the next subtitle was rendered. If the subtitles were played at a speed that is readable, then the subtitles would be out of sync with the media asset.

Figure 2:
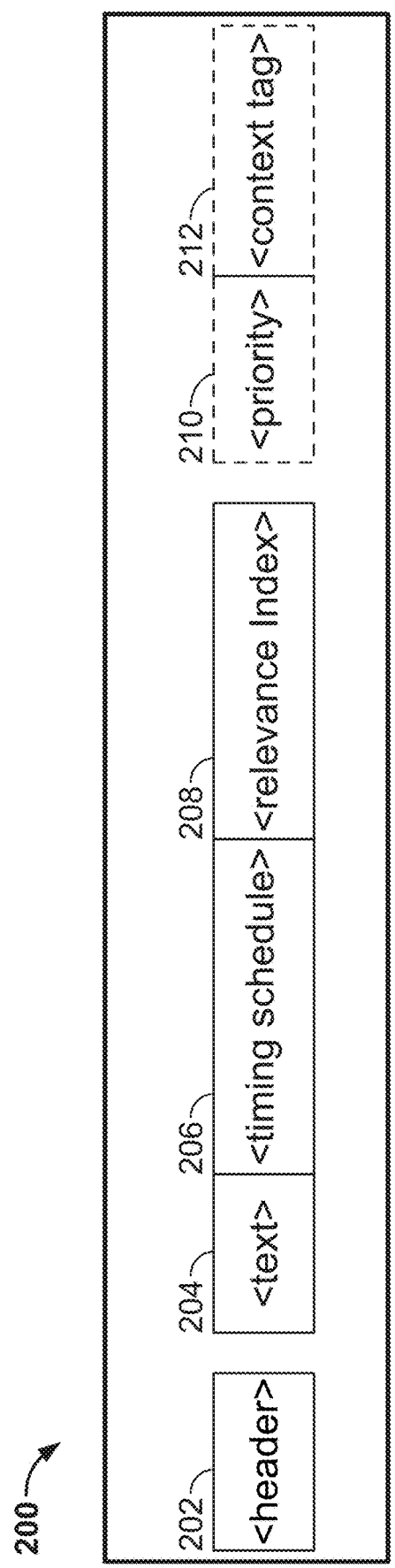
FIG. 2 illustrates an exemplary timed text file format, in accordance with some embodiments of the disclosure.

FIG. 2 illustrates an exemplary timed text file 200, in accordance with some embodiments of the disclosure. In an exemplary timed text file 200 there is provided a header 202, text 204, timing schedule 206, relevance index 208 and, optionally, an indication of priority 210 and a context tag 212.

The timed text file 200 is a container file for chunks of data that are time-aligned with a video or audio resource (herein referred to as a media asset). It can therefore be regarded as a serialization format for time-aligned data. As shown in FIG. 2, a timed text file 200 starts with a header 202 and then contains a series of data blocks (202-212). In some examples, the header of the timed text file identifies the format that the timed text file is in (e.g., WebVTT, TTML, SubRip, or the like). In some examples, the header can be omitted from being present within timed text file 200 because the file format of text file 200 can be indicated by the filename extension suffix, for example, ".xml," ".srt," ".dfxp," ".ttl," and ".txt." In these examples, the header may be thought of as the file extension suffix.

In some examples, the data blocks of a timed text file may comprise a block indicating text 204, a timing schedule 206, a relevance index 208, an indication of priority 210, a context tag 212. Other examples of data blocks include chapters, metadata on the scene, the speakers, comments, typesetting and fonts.

In some examples, a data block may be a text 204 for displaying on the media asset, i.e., the subtitle text itself. The text data block 204 may comprise any text or character with an equivalent Unicode Code Point. In some examples, the text 204 is the only portion of the timed text file 200 that will be rendered on the media asset to be displayed to the user. It is common for a timed text caption or subtitle to be rendered as an overlay on top of a video viewport of a media asset or into a region, that is a subarea of the video viewport.

In some examples, a data block may be a timing schedule 206. Timing schedule 206 may further comprise a start and an end time. In some examples, a timing schedule 206 with a start time and an end time is referred to as a cue. In some examples, there may be a minimum duration that the timing schedule 206 indicates. For example, a minimum duration of ⅚ (five-sixths) of a second per subtitle event (e.g., 20 frames for 24 frames per second video, although any period may be chosen as a minimum duration). In addition, in some examples, there may be a maximum duration that the timing schedule 206 indicates. For example, the timing schedule may comprise a start time and a duration of 5 seconds (e.g., 120 frames for (24 frames per second video) starting at 1 second).

In some examples, a data block may be a relevance index 208. In some examples, the relevance index 208 is an integer representation of the playback rate of the media asset. A relevance index 208 of 1 may be used to represent a media asset playback rate of 1×, for example. Likewise, a relevance index 208 of 4 may be used to represent a media asset playback rate of 4×, and so on. Relevance indexes are not limited to integer numbers: they may be fractional, decimal, or non-numeric in representation (e.g., words, letters, special characters and so on). Further examples of the format of a relevance index 208 can found with reference to FIG. 3 and the relevant portion of this description.

As shown in FIG. 2, the relevance index 208 has already been determined and is present in the timed text file 200. The relevance index 208 may be determined based on the playback rate of a media asset, as is described with regard to FIG. 5, and is further described with reference to FIG. 6, below. By way of summary, in an exemplary use, when a user has selected to watch a video on a video player or platform at a playback rate of 4×, the relevance index would reflect this setting, and an appropriate set of subtitles would be selected so that the subtitles are readable at a playback rate of 4×, which would otherwise not be possible with the subtitles at 1× or 2× playback rate (due to the speed at which the subtitles would be presented to the user).

The timed text file 200, may further comprise a data block that represents an indication of priority 210. The indication of priority 210 gives subtitles of a same, or similar, relevance index 208 an additional layer of granularity, which can be used to create an order of importance of the subtitles within timed text file 200. In this way, the indication of priority 210 can be used by the system to determine an order of rendering the subtitles, so that the most important text 204 is always displayed to the user.

The timed text file 200, may further comprise a context tag 212. In some examples, the context tag 212 is used to provide context to the text 204, timing schedule 206, relevance index 208, or indication of priority 210. The context tag may represent language, subject matter or speaker of the text 204. In some examples, the context tag is configurable by the user, or is configured by a user profile of the user, which can be obtained by control circuitry.

In some examples, the data blocks 204-212 as described above further comprise metadata. In some examples, a text data block 204 may further comprise rules on line treatment or a character limitation. For example, text is optimally kept to one line, unless it exceeds the character limitation, in which case the text may comprise two lines but only if certain conditions are met, such as breaking the line only after punctuation marks, before conjunctions, and before prepositions. In some examples, the line break should not separate a noun from an article, a noun from an adjective, a first name from a last name, a verb from a subject pronoun, a prepositional verb from its preposition, or a verb from an auxiliary, reflexive pronoun or negation. Other grammatical rules may also be examples of metadata in the text 204 data block. The start time and end time as discussed with reference to timing schedule 206 are considered examples of metadata of the timing schedule 206 data block.

Context tag 212 may comprise subject matter and sub-tags to elaborate on the subject-matter. For example, a context tag may represent that the subject matter of text 204 is for a law class at a university course, e.g., LAW101. A sub-tag may represent that the specific law discussed in text 204 is criminal law. A sub-tag is also considered an example of metadata that can be present within a data block of timed text file 200. Other examples of metadata that may be present within a specific data block 204-214 include inline comments, font, alignment, sizing, color weighting.

In some examples, each text 204 comprises metadata that indicates who is talking or saying the text 204. In some examples, additional metadata may indicate the change in speaker by signalling differences in font type (e.g., italics) or color (e.g., white for one speaker, yellow for another). In some examples, the metadata specifying the speaker is also annotated with further metadata from the context tag 212, which may be a description of how the text was spoken (e.g., "first" or "loud"). It should be understood that the metadata of one data block may interact with, or provide data for, another data block.

Timed text files may comprise metadata that enables captions or subtitles for video content, text video descriptions, chapters for content navigation, and more generally any form of metadata that is time-aligned with audio or video content.

Any data blocks 202-212 that are not understood by legacy media asset players due to the fact have not been updated to read such data blocks would be ignored. Therefore, in some examples, the timed text file 200 is backwards compatible with legacy media asset players. Data blocks 202-212 may be separated by lines, commas, semicolons, special characters, or any other common choices of syntax used in computing languages such as C++, C#, Python, R, Java, JavaScript, HTML, and the like.

Subtitles are often provided in a format known as Web Video Text Tracks (WebVTT), which is a World Wide Web Consortium (W3C) standard for displaying timed text in connection with the HTML5<track> element. Other common caption formats include XML-based Timed Text Markup Language (TTML) and the "SubRip" file format. Timed text refers to the presentation of text media in synchrony with other media, such as audio and video. Therefore, all timed text formats should be considered as falling within the scope of the methods and embodiments herein. While different timed text formats are compatible across a number of different devices and browsers due to their slight differences, all these formats contain text information to be displayed alongside a media asset such as audio, video, or a combination of both.

Different kinds of data can be carried in timed text files. The HTML specification identifies captions, subtitles, chapters, audio descriptions and metadata as data kinds and specifies which one is being used in the text track kind attribute of the <text track> element in HTML51.

Figure 3A:
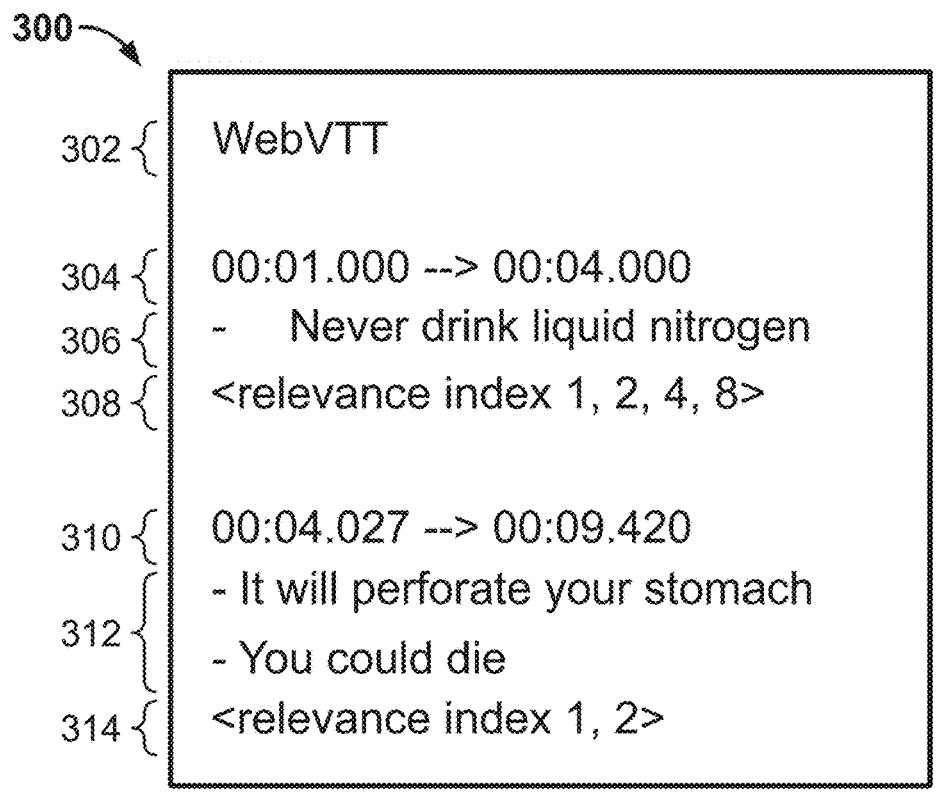
FIGS. 3A and 3B illustrate an exemplary timed text file in WebVTT format, in accordance with some embodiments of the disclosure.
Figure 3B:
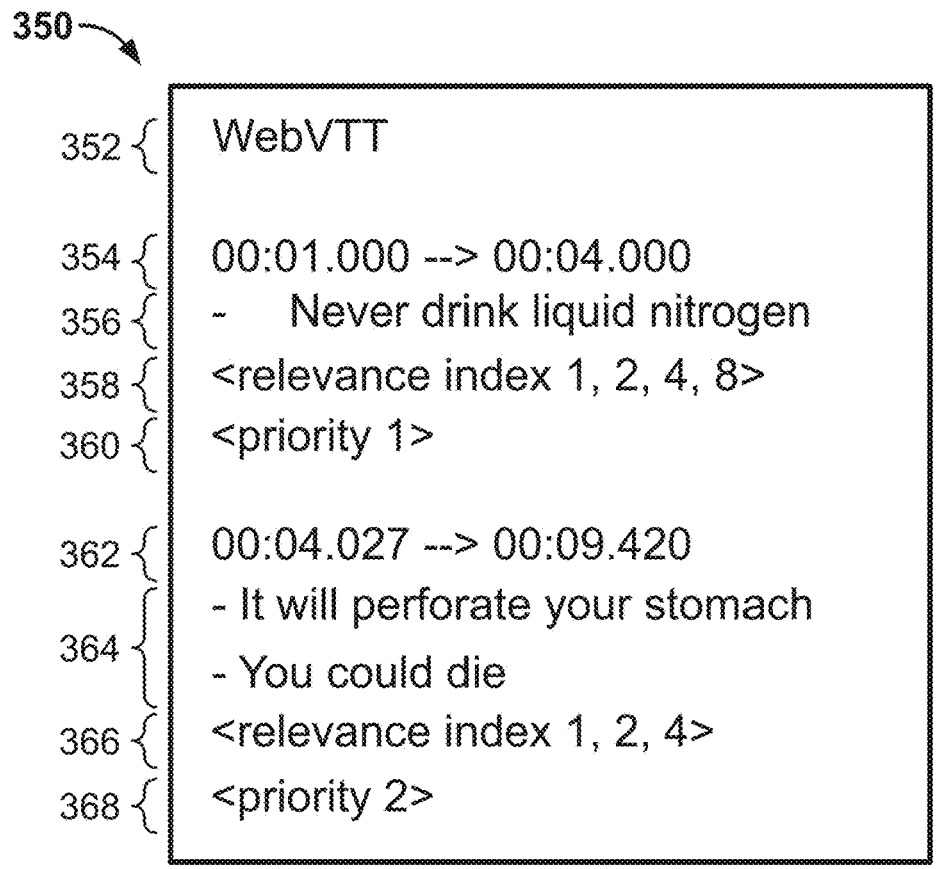

FIGS. 3A and 3B illustrate exemplary timed text files 300 and 350 in a WebVTT format, in accordance with some embodiments of the disclosure. The timed text files 300 and 350 in general consist of a sequence of text segments 306, 312, 356 and 362 associated with a time schedule 304, 310, 354 and 362, sometimes referred to as a cue. Beyond captioning and subtitling, the timed text files 300 and 350 can be used for time-aligned metadata, as described above with reference to FIG. 2. The timed text file 300 and 350 can also be used for delivering chapters, which helps with contextual navigation around an audio/video file (not shown). In addition, timed text files 300 and 350 can be used for the delivery of text video descriptions, which is text that describes the visual content of time intervals and can be synthesized to speech to help vision-impaired users understand context, which may be a part of the text 204 or context tag 212 data blocks, as described with reference to FIG. 2 above.

FIG. 3A is an exemplary representation of an approach according some embodiments of the present disclosure. There is provided a timed text file 300 in WebVTT format, as indicated by header 302. The timed text file 300 further comprises a time schedule 304 which indicates when the time-aligned data in the text segment 306 is to be displayed. The time schedule 304 refers to time segments of a media asset. Timed text file 300 further comprises a relevance index 308. As shown, in this exemplary case, the text 304 has a relevance index 308 of 1, 2, 4 and 8, which are based on the playback rate of the media asset, such that 4 represents a playback rate four times the original speed. In this example, the text phrase "Never drink liquid nitrogen" has been assigned all four playback rates possible by the media asset player (not shown) that will play the media asset and use the timed text file 300 to provide subtitles.

Timed text file 300 also comprises a further time schedule 310, associated text 312, and relevance index 314. In the present example, the text 312 comprises the lines "it will perforate your stomach" and "You could die." The relevance index 314 assigned to the text 312 is shown as 1 and 2. Note that, when the media asset player has a playback rate of 4× or 8×, only the text 306 will be displayed to the user as the text 312 does not have a relevance index 314 of 4 or 8. In this way, due to the shortening of time this portion of the media asset will be played, the phrase "Never drink liquid nitrogen" will always be shown and the additional text 312 only when the media asset is played at certain playback rates. In some examples, the most important information is always shown in this manner, and the relevance index can be used in this way to reflect the most important data.

FIG. 3B, is an exemplary representation of an approach according to some embodiments of the present disclosure. Timed text file 350 comprises a time schedule 354, associated text 356, and relevance index 358, which are the same as their counterparts in timed text file 300. However, in addition, there is also provided an indication or priority 360 and 368. In this way, the system understands that the highest-priority text (indicated by priority 1 in this example) is the most important and must be rendered first. Then, the other text 364 can be rendered next (indicated by priority 2 in this example).

The additional entry of the indication of priority 368 in timed text 350 has enabled the relevance index 366 to also comprise an index of 4, wherein the counterpart in 314 did not. This is because, due to the indication of priority 368 being lower than the indication of priority 360, the system knows to render the text 364 only after the text 356 has been rendered. Therefore, the text 364 will be rendered only if possible within the time schedule 362. It should be understood that with multiple lines of subtitles and text to render in the timed text file 350, this additional layer of granularity in rendering subtitles can ensure that the most important information is seen by a user and additional information only if the playback rate will allow it.

In some examples, the playback rate is variable. For example, the user can watch the media asset at a higher playback rate until they find a region of interest in the media asset and then lower the playback rate and get more information. Moreover, in some examples, the indication of priority can override the current selected relevance index and alter the playback rate if, for example, the indication of priority is such that the text to be played in that time schedule would be too fast and the user would miss important information. In other words, a dynamic variable playback rate experience can be provided by the interaction of the relevance index 208 and indication of priority 210.

Figure 4:
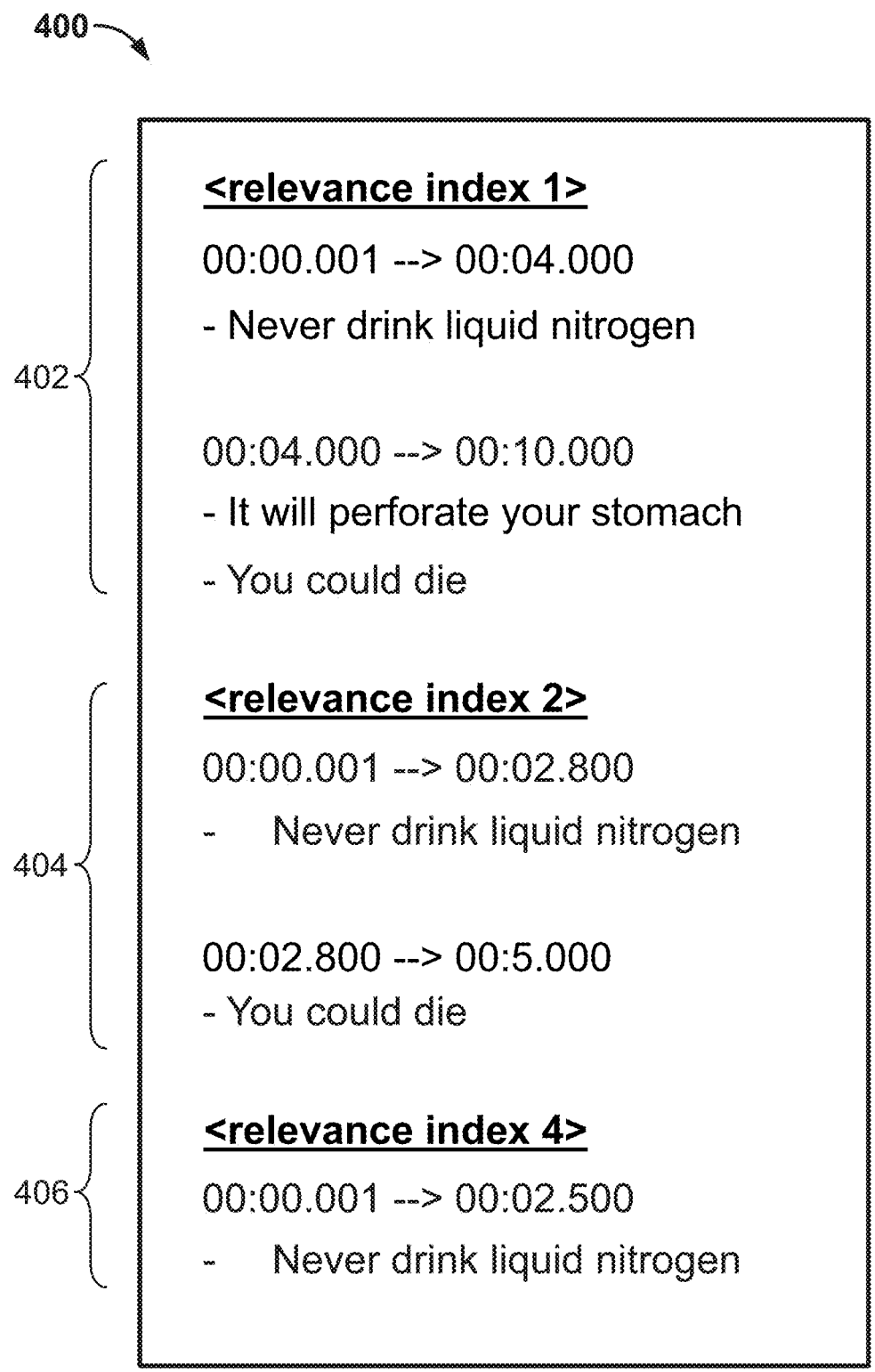
FIG. 4 illustrates an exemplary timed text file format, in accordance with some embodiments of the disclosure.

FIG. 4 illustrates an exemplary timed text file 400, in accordance with some embodiments of the disclosure. The timed text file 400 comprises a first variant 402 of the timed text, a second variant 404 of the timed text, and a third variant 406 of the timed text. It should be understood that although only three variants are provided, this is for illustration purposes only and more or fewer variants may be provided. Indeed, in some examples, the number of variants is equivalent with the number of relevance indices, which, as discussed, are based on the playback rate of the media asset player or user's device.

As shown in FIG. 4, each variant of the timed text file 400 is created such that all of the text for the relevance index is provided within the variant. In some examples, the timing schedule 206 of the timed text file 400 is adapted according to the relevance index. For example, as can be seen from the first variant 402, which has a relevance index of 1, which in this case is representative of original speed (i.e., at 1× playback rate), the total timing schedule 206 is 10 seconds. The second variant 404, with a relevance index of 2 (representative of 2× playback rate), has a total timing schedule 206 of 5 seconds. Due to the increase in playback rate, and therefore reduction in viewing time, the text 204 has also been reduced to the information that is determined to be more important for that relevance index. The third variant 406 has a relevance index of 4 (representative of 4× playback rate) and a total timing schedule 206 of 2.5 seconds, and therefore the text 204 has been amended to include only the most important information.

In some examples, a user, in changing the playback rate, will cause a change in relevance index and therefore the timing schedule and text may also change, as shown in FIG. 4.

In some examples, the content creators of the media asset provide subtitles for their content. In other examples, the platform on which the media asset is being played determines the subtitles by speech recognition or natural language processing. Therefore, the relevance index and/or the indication of priority for any of the plurality of subtitles may be provided by the content creator, or by artificial intelligence or natural language processing. In some examples, the natural language processing or artificial intelligence used on the media asset can determine the most relevant portions of the media. In particular, the most relevant text, text strings, or tags; their timing schedule and the like can be determined and the relevance index and/or indication of priority determined.

When consuming a media asset, "scrubbing" is an interaction in which a user drags their finger (in the case of smartphone devices or the like) or their cursor (in the case of PCs or the like) across a segment of the media asset through the media asset player. Scrubbing is a convenient way to quickly navigate through a media asset such as a video or audio file, and is often accompanied by a preview of the media asset. For example, when the media asset is a video and the user is scrubbing through a timeline of the video through a media asset, a thumbnail is shown. In another example, when the media asset is an audio file and the user is scrubbing through a segment of a waveform to hear it, no thumbnail is provided.

Such scrubbing events may be seen as variable playback rates of the media asset and therefore an associated relevance index is provided in the timed text. In some examples, when a user is scrubbing the media asset, a relevance index is determined and the subtitles rendered. In this way, dynamic rendering of subtitles is provided based on a user-determined variable playback rate. In some examples, the polling of the users scrubbing rate, which may be thought of as the determination of the playback rate of the media asset, may be performed immediately after the selected set of subtitles is rendered. For example, if a user is scrubbing at an equivalent rate of 5.4×, then a relevance index associated with the 5.4× playback rate is determined and a set of the plurality of subtitles is selected and rendered. As the rendering is completed, or in parallel to the rendering, the system can redetermine the playback rate based on the user's scrubbing of the media asset timeline.

In conventional systems, the subtitles are provided by speech-to-text recognition as the video segments are being downloaded by the media asset player. Therefore, when a user is scrubbing along a video, the subtitles are not rendered as there is no audio data to perform speech to text on. In addition, when conventional media asset players have a playback rate greater than 2×, audio is no longer provided because beyond this speed audio is often unintelligible and therefore considered not useful for the user. By selecting the subtitles based on a relevance index, which is based on the playback rate of the video, subtitles can always be provided to the user. Indeed, in some examples, the user may wish to consume the media content at a rate greater than 2× and may not care if there is no audio, and may simply wish to understand the context of the media asset. Therefore, there is a need to provide subtitles in a new way.

In some examples, when a user is scrubbing through a video thumbnail, the subtitles are also rendered on the thumbnail. In this way, when the user is scrubbing through a video, they are better able to find specific sections of the video. For example, there are a number of computer build videos that are live-streamed by popular YouTubers such as "Linus Tech Tips" and "JayzTwoCents", which are available for rewatching after the live-stream event. If a user was looking at a particular section of the video, for example where the streamer was installing the RAM into the system, it would aid the user if the subtitles were provided on the thumbnail as the content creator likely will be talking about the RAM as they install it. Without the subtitles, however, it is difficult to get the context of any particular segment of the video as the camera angles may be relatively static during a long stream.

In conventional systems, when scrubbing through an audio waveform, no subtitles are rendered. Therefore, in some examples of the present disclosure, subtitles are provided when scrubbing through the waveform of an audio-only media asset, where possible.

Figure 5:
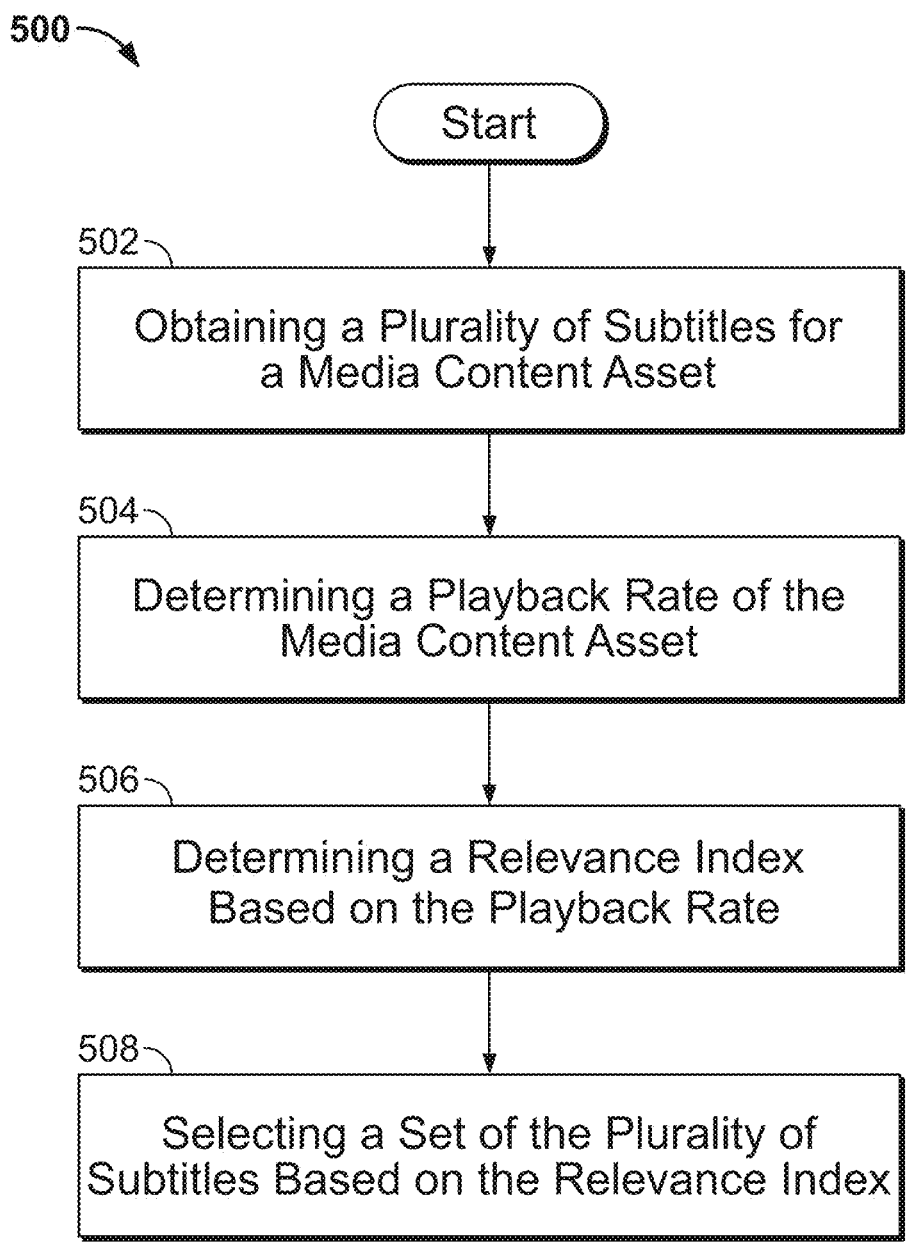
FIG. 5 is a flowchart of illustrative steps involved in providing timed text with a relevance index, in accordance with some embodiments of the disclosure.

FIG. 5 depicts a flowchart 500 of illustrative method steps involved in providing timed text with a relevance index, in accordance with some embodiments of the disclosure. At step 502, the method comprises obtaining a plurality of subtitles for a media asset. In some examples, the subtitles are stored on a storage medium, such as storage 738 as described with reference to FIG. 7). In addition, the method may be carried out by processing circuitry or control circuitry (such as control circuitry 728 as described with reference to FIG. 7), which may in turn provide instructions to other sub-circuits contained within control circuitry. For example, the processing and/or control circuitry may be responsible for determining information from the plurality of subtitles, media content players or the like.

At step 504, the method comprises determining a playback rate of the media asset. In some examples, the media asset is played on a media asset player. The media asset player will conventionally be configured to play the media asset at "original speed" or 1× playback speed however, the media asset player may be configured to play the media asset at a different speeds and any combination of trick play or variable playback rates greater than 1×.

At step 506, the method comprises determining a relevance index based on the playback rate. In some examples, the relevance index is an integer representation of the playback rate of the media asset. A relevance index of 1 may be used to represent a media asset playback rate of 1×, for example. Likewise, a relevance index of 4 may be used to represent a media asset playback rate of 4×, and so on. Relevance indexes are not just limited to integer numbers: they may be fractional, decimal, or non-numeric in representation (e.g., words, letters, special characters and so on).

At step 508, the method comprises selecting a set of the plurality of subtitles based on the relevance index. In some examples, the timed text files 200, 300, 350 comprising the subtitles (in FIGS. 2, 3A and 3B, respectively) also comprise data blocks representing the relevance index, as was discussed in more detail above with regard to FIGS. 3A, 3B and 4. For example, when a user has selected to watch a media asset on a media player or platform at a playback rate of 4×, the relevance index would reflect this setting, and the system would then select appropriate set of subtitles so that the subtitles are readable at a playback rate of 4×. In conventional systems, the subtitles of original speed would simply be played at 4×, a rate at which it would not be possible to read each subtitle in its entirety before the next subtitle was rendered. If the subtitles were played at a speed that is readable, then the subtitles would be out of sync with the media asset. Such problems are overcome with the aspects, embodiments, and examples of the present disclosure.

Figure 6:
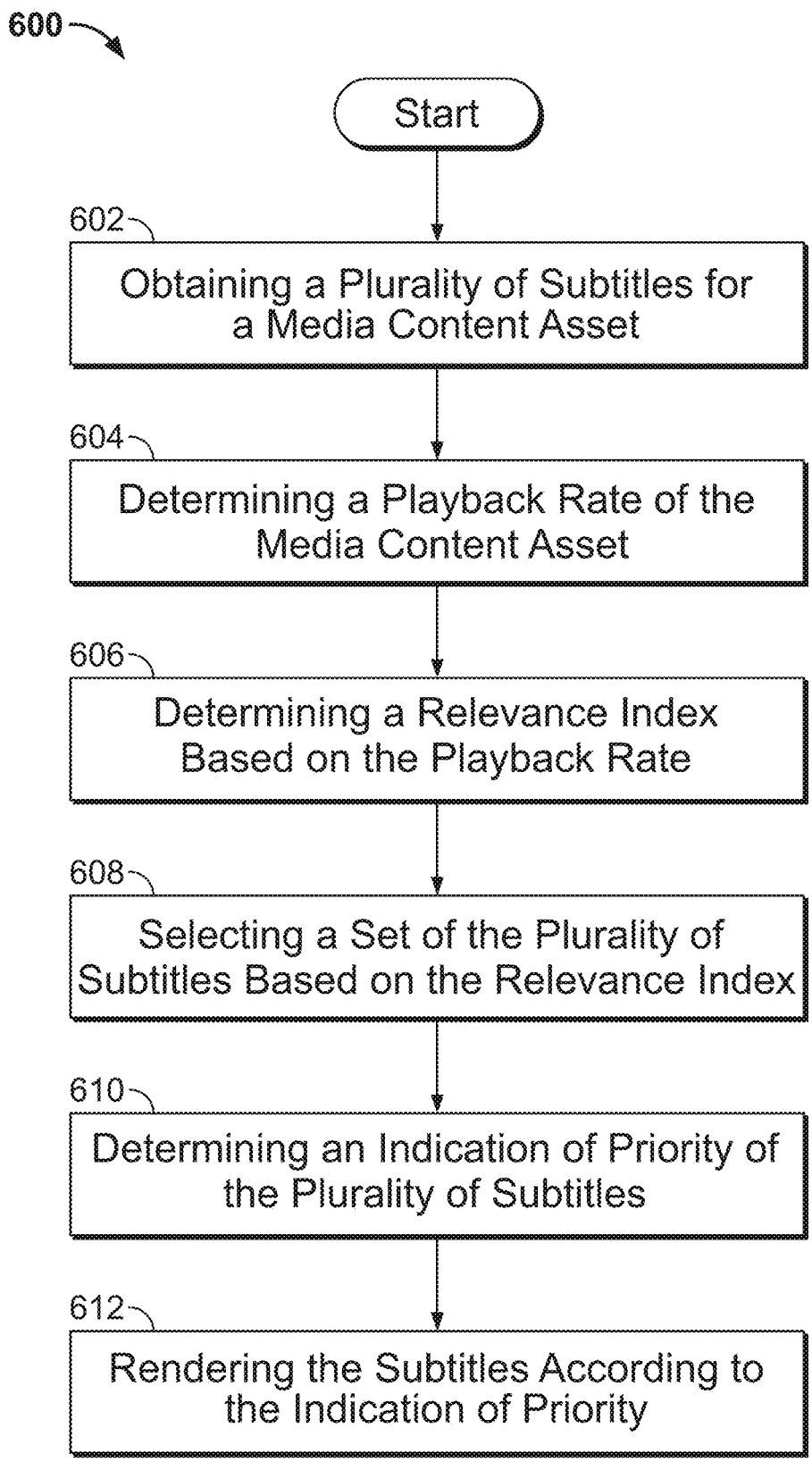
FIG. 6 is a flowchart of illustrative steps involved in providing timed text with a relevance index and an indication of priority, in accordance with some embodiments of the disclosure.

FIG. 6 depicts a flowchart 600 of illustrative method steps involved in providing timed text with a relevance index, in accordance with some embodiments of the disclosure. At step 602, the method comprises obtaining a plurality of subtitles for a media asset. In some examples, the subtitles are stored on a storage medium, such as storage 738 as described with reference to FIG. 7). In addition, the method may be carried out by processing circuitry or control circuitry (such as control circuitry 728 as described with reference to FIG. 7), which may in turn provide instructions to other sub-circuits contained within control circuitry. For example, the processing and/or control circuitry may be responsible for determining information from the plurality of subtitles, media content players or the like.

At step 604, the method comprises determining a playback rate of the media asset. In some examples, the media asset is played on a media asset player. The media asset player will conventionally be configured to play the media asset at "original speed" or 1× playback speed however, the media asset player may be configured to play the media asset at a different speeds and any combination of trick play or variable playback rates greater than 1×.

At step 606, the method comprises determining a relevance index based on the playback rate. In some examples, the relevance index is an integer representation of the playback rate of the media asset. A relevance index of 1 may be used to represent a media asset playback rate of 1×, for example. Likewise, a relevance index of 4 may be used to represent a media asset playback rate of 4×, and so on. Relevance indexes are not just limited to integer numbers: they may be fractional, decimal, or non-numeric in representation (e.g., words, letters, special characters and so on).

At step 608, the method comprises selecting a set of the plurality of subtitles based on the relevance index. In some examples, the timed text files 200, 300 and 350 comprising the subtitles (in FIGS. 2, 3A and 3B, respectively) also comprise data blocks representing the relevance index, as was discussed with reference to FIGS. 3A, 3B and 4 above. For example, when a user has selected to watch a media asset on a media player or platform at a playback rate of 4×, the relevance index would reflect this setting, and the system would then select appropriate set of subtitles so that the subtitles are readable at a playback rate of 4×. In conventional systems, the subtitles of original speed would simply be played at 4×, a rate at which it would not be possible to read each subtitle in its entirety before the next subtitle was rendered. If the subtitles are played at a speed that is readable, then the subtitles would be out of sync with the media asset. Such problems are overcome with the aspects, embodiments, and examples of the present disclosure.

At step 610, the method comprises determining an indication of priority of the plurality of subtitles. At step 612, the method comprises rendering the subtitles according to the indication of priority. In some examples, the indication of priority represents the order in which the subtitles are rendered, or whether some are rendered at all.

The processing model for rendering timed text formats, in particular WebVTT, is quite tightly linked to media elements in HTML, where cascading style sheets (CSS) are available.

Conventionally, devices and media asset players that do not support CSS are expected to render plain text only, without styling and positioning features; however, such devices can still take advantage of the present examples.

In some examples, the output of the steps above may be a set of CSS boxes that covers the rendering area of the media asset, which devices render according to the relevance index. In other examples, the rendering may be according to the relevance index and an indication of priority, as described above with reference to FIGS. 3A, 3B and 4.

In some examples, the information that is determined in the methods herein may be determined from a user profile. A user profile is generally configured to store and maintain data about the user of the database system, which may be a part of or a component of a profile management system. The data can include general information, such as identifiable user information, a biographical summary, and the like.

In particular, in some examples, the user profile comprises a previous media asset player configuration, such as playback rate or first language. For example, a user who is an English speaker may select to watch a media asset in Japanese language at 4× speed. This information is stored in the user profile and can be used to determine the relevance index for each instance of the same user who watches a different asset in Japanese language. The term "stored" generally refers to a data entity, such as a past instance of playing the media asset by a user of the media asset player.

In some examples, training videos are examples of media assets that include video such as recorded lectures from universities or schools, health and safety videos, language learning videos and the like. Often such videos are unscripted and may contain additional information which is unnecessary or in addition to the main points or context of the video, or indeed the videos (and therefore the content) are scripted but provided by the content creator at a slower pace for better understanding. While the user may wish to consume media assets such as these at an increased rate to cover more training or recap a lecture, they may not wish to miss the important information.

Therefore, in some examples, the information used to determine the playback rate, the indication of priority, and context tag can be obtained, or obtained in part, from the user profile. The user profile may contain various configuration information relevant to the timed text file. For example, the user may have different configurations for Japanese language than Korean Language. In some examples, the user may have different configurations based on content of the media asset, and exceptions within those configurations. For example, law lectures may have a playback rate of 4×, unless the lecture comprises criminal law, in which case the playback rate may be 2×. A user may choose configurations such as these based on their personal interests or experiences in watching media assets with common tags. In some examples, the system can use these historic media asset viewing experiences to determine media assets for future configurations without input from the user.

FIG. 7 is a block diagram representing devices, components of each device, and data flow therebetween for a system for providing timed text, in accordance with some embodiments of the disclosure. System 700 is shown to include a client device 718, a server 702 and a communication network 714. It is understood that while a single instance of a component may be shown and described relative to FIG. 7, additional instances of the component may be employed. For example, server 702 may include, or may be incorporated in, more than one server. Similarly, communication network 714 may include, or may be incorporated in, more than one communication network. Server 702 is shown communicatively coupled to client device 718 through communication network 714. While not shown in FIG. 7, server 702 may be directly communicatively coupled to client device 718, for example, in a system absent or bypassing communication network 714.

Client device 718 may have stored thereon executable instructions, or a program such as a media asset player configure to carry out the processes as described herein, in particular those described with reference to FIGS. 5 and 6.

Communication network 714 may comprise one or more network systems, such as, without limitation, an internet, LAN, WIFI or other network systems suitable for audio processing applications. In some embodiments, system 700 excludes server 702, and functionality that would otherwise be implemented by server 702 is instead implemented by other components of system 700, such as one or more components of communication network 714. In still other embodiments, server 702 works in conjunction with one or more components of communication network 714 to implement certain functionality described herein in a distributed or cooperative manner. Similarly, in some embodiments, system 700 excludes client device 718, and functionality that would otherwise be implemented by client device 718 is instead implemented by other components of system 700, such as one or more components of communication network 714 or server 702 or a combination. In still other embodiments, client device 718 works in conjunction with one or more components of communication network 714 or server 702 to implement certain functionality described herein in a distributed or cooperative manner.

Client device 718 includes control circuitry 728, display 734 and input output circuitry 716. Control circuitry 728 in turn includes transceiver circuitry 762, storage 738 and processing circuitry 740. In some embodiments, client device 718 or control circuitry 728 may be configured as the media asset player referenced herein Server 702 includes control circuitry 720 and storage 724. Each of storages 724 and 738 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 724, 738 may be used to store various types of content, media data, and or other types of data (e.g., they can be used to store multimedia content such as audio, video and advertisement data). Non-volatile memory may also be used (e.g., to launch a boot-up routine and other instructions). Cloud-based storage may be used to supplement storages 724, 738 or instead of storages 724, 738. In some embodiments, the pre-encoded or encoded multimedia content, in accordance with the present disclosure, may be stored on one or more of storages 724, 738.

In some embodiments, control circuitry 720 and/or 728 executes instructions for an application stored on memory (e.g., storage 724 and/or storage 738). Specifically, control circuitry 720 and/or 728 may be instructed by the application to perform the functions discussed herein. In some implementations, any action performed by control circuitry 720 and/or 728 may be based on instructions received from the application. For example, the application may be implemented as software or a set of executable instructions that may be stored on storage 724 and/or 738 and executed by control circuitry 720 and/or 728. In some embodiments, the application may be a client/server application where only a client application resides on client device 718, and a server application resides on server 702.

The application may be implemented using any suitable architecture. For example, it may be a stand-alone application wholly implemented on client device 718. In such an approach, instructions for the application are stored locally (e.g., in storage 738), and data for use by the application is downloaded on a periodic basis (e.g., from an out-of-band feed, from an internet resource, or using another suitable approach). Control circuitry 728 may retrieve instructions for the application from storage 738 and process the instructions to perform the functionality described herein. Based on the processed instructions, control circuitry 728 may determine a type of action to perform in response to input received from input/output path (or input output circuitry) 716 or from communication network 714. For example, in response to a network bandwidth maximum, control circuitry 728 may perform the steps of processes relative to various embodiments discussed herein.

In client/server-based embodiments, control circuitry 728 may include communication circuitry suitable for communicating with an application server (e.g., server 702) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 714). In another example of a client/server-based application, control circuitry 728 runs a web browser that interprets web pages provided by a remote server (e.g., server 702). For example, the remote server may store the instructions for the application in a storage device. The remote server may process the stored instructions using circuitry (e.g., control circuitry 728) and/or generate displays. Client device 718 may receive the displays generated by the remote server and may display the content of the displays locally via display 734. This way, the processing of the instructions is performed remotely (e.g., by server 702) while the resulting displays, such as the display windows described elsewhere herein, are provided locally on client device 718. Client device 718 may receive inputs from the user via input circuitry 716 and transmit those inputs to the remote server for processing and generating the corresponding displays. Alternatively, client device 718 may receive inputs from the user via input circuitry 716 and process and display the received inputs locally, by control circuitry 728 and display 734, respectively.

Server 702 and client device 718 may transmit and receive content and data such as media content via communication network 714. For example, server 702 may be a media content provider, and client device 718 may be a smart television configured to download or stream media content, such as a video from popular content creators such as "Mr. Beast" from server 702. Control circuitry 720, 728 may send and receive commands, requests, and other suitable data through communication network 714 using transceiver circuitry 760, 762, respectively. Control circuitry 720, 728 may communicate directly with each other using transceiver circuitry 760, 762, respectively, avoiding communication network 714.

It is understood that client device 718 is not limited to the embodiments and methods shown and described herein. In nonlimiting examples, client device 718 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media centre, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 720 and/or 718 may be based on any suitable processing circuitry such as processing circuitry 726 and/or 740, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 720 and/or control circuitry 718 are configured to implement a media content operation system, such as systems, or parts thereof, that perform various media content manipulation processes described herein.

Client device 718 receives a user input 704 at input circuitry 716. For example, client device 718 may receive a user input like a user swipe or user touch, as previously discussed. In some embodiments, client device 718 is a media device (or player), with the capability to access media content. It is understood that client device 718 is not limited to the embodiments and methods shown and described herein. In nonlimiting examples, client device 718 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media centre, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 704 may be received from a user selection-capturing interface that is separate from device 718, such as a remote-control device, trackpad or any other suitable user movement sensitive or capture devices, or as part of device 718, such as a touchscreen of display 734. Transmission of user input 704 to client device 718 may be accomplished using a wired connection, such as an audio cable, USB cable, ethernet cable or the like attached to a corresponding input port at a local device, or may be accomplished using a wireless connection, such as BLUETOOTH, Wi-Fi, WiMAX, ZIGBEE, GSM, UTMS, CDMA, TDMA, 3G, 4G, 4G LTE, or any other suitable wireless transmission protocol. Input circuitry 716 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 740 may receive input 704 from input circuit 716. Processing circuitry 740 may convert or translate the received user input 704 that may be in the form of gestures or movement to digital signals. In some embodiments, input circuit 716 performs the translation to digital signals. In some embodiments, processing circuitry 740 (or processing circuitry 726, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. In this specification, the following terms may be understood in view of the below explanations:

For the avoidance of doubt, the systems and methods provided herein apply equally to subtitles and captions. For example, in some jurisdictions the term subtitles is taken to mean a textual description that is used when the viewer can hear but cannot understand the language or accent, or the speech is not entirely clear, and so subtitles may transcribe only dialogue and some on-screen text. Captions may aim to describe to the deaf and hard of hearing all significant audio content, such as spoken dialogue and non-speech information such as the identity of speakers and, occasionally, their manner of speaking, along with any significant music or sound effects using words or symbols. However, in other jurisdictions, the term subtitles does not distinguish between subtitles and captions. Thus, for the sake of brevity throughout the following disclosure, the term subtitles will be used to mean subtitles and/or captions.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
   providing a media asset for consumption, the media asset comprising a plurality of segments and a first segment of the plurality of segments corresponding to a text segment;
   obtaining a timed text file comprising a time schedule for each of the plurality of segments of the media asset, wherein the first segment of the plurality of segments is associated with a plurality of variants of the corresponding text segment, and a relevance index for each variant of the text segment corresponding to one or more playback rates of the media asset, wherein the relevance index is based at least in part on each variant of the text segment being readable at the corresponding one or more playback rates;
   determining a playback rate of the first segment; and
   selecting, from the timed text file, a variant of the plurality of variants of the corresponding text segment for display in the first segment based at least in part on the determined playback rate of the media asset and the relevance index of the variant.

2. The method of claim 1, further comprising determining an indication of priority of the variant of the plurality of variants of the corresponding text segment.

3. The method of claim 2, further comprising rendering the variant of the corresponding text segment according to the indication of priority.

4. The method of claim 3, wherein the highest-priority variant of the corresponding text segment is rendered first.

5. The method of claim 1, wherein the timed text file comprises a header and a plurality of data blocks.

6. The method of claim 5, wherein each data block comprises at least one of:
the variant of the corresponding text segment for display;
the time schedule;
the relevance index;
an indication of priority; or
a context tag.

7. The method of claim 6, wherein the time schedule comprises a start time and an end time for displaying the variant of the corresponding text segment.

8. The method of claim 1, further comprising:
displaying the selected variant of the corresponding text segment; and
displaying the media asset.

9. The method of claim 8, further comprising overlaying the variant of the corresponding text segment on the media asset.

10. The method of claim 1, wherein the playback rate is signaled by a media asset player configured to play the media asset.

11. The method of claim 1, wherein the playback rate is selected by a user.

12. The method of claim 1, further comprising accessing a user profile.

13. The method of claim 12, wherein the user profile contains data indicative of the playback rate.

14. A system comprising:
memory configured to store timed text; and
control circuitry configured to:
provide a media asset for consumption, the media asset comprising a plurality of segments and a first segment of the plurality of segments corresponding to a text segment;
obtain a timed text file comprising a time schedule for each of the plurality of segments of the media asset, wherein the first segment of the plurality of segments is associated with a plurality of variants of the corresponding text segment, and a relevance index for each variant of the text segment corresponding to one or more playback rates of the media asset, wherein the relevance index is based at least in part on each variant of the text segment being readable at the corresponding one or more playback rates;
determine a playback rate of the first segment; and
select, from the timed text file, a variant of the plurality of variants of the corresponding text segment for display in the first segment based at least in part on the determined playback rate of the media asset and the relevance index of the variant.

15. The system of claim 14, wherein the control circuitry is further configured to determine an indication of the priority of the variant of the plurality of variants of the corresponding text segment.

16. The system of claim 15, wherein the control circuitry is further configured to render the variant of the corresponding text segment according to the indication of priority.

17. The system of claim 16, wherein the highest-priority variant of the corresponding text segment is rendered first.

* * * * *